United States Patent [19]

Abbott et al.

[11] Patent Number: 5,271,750
[45] Date of Patent: *Dec. 21, 1993

[54] AIR FILTRATION SYSTEM WITH SAFETY AFTER-FILTER

[75] Inventors: Kenneth E. Abbott; Patrick J. Lyons, both of Tucson, Ariz.

[73] Assignee: Stripping Technologies, Inc., Tucson, Ariz.

[*] Notice: The portion of the term of this patent subsequent to Sep. 15, 2009 has been disclaimed.

[21] Appl. No.: 939,101

[22] Filed: Sep. 1, 1992

Related U.S. Application Data

[63] Continuation-in-part of Ser. No. 731,755, Jul. 15, 1991, Pat. No. 5,147,427.

[51] Int. Cl.⁵ .............................................. F01D 46/04
[52] U.S. Cl. ................................... 55/213; 55/274; 55/324; 55/385.2
[58] Field of Search .............. 55/274, 302, 356, 324, 55/334, 429, 212, 213

[56] References Cited

U.S. PATENT DOCUMENTS

| | | | |
|---|---|---|---|
| 2,880,819 | 4/1959 | King et al. | 55/213 |
| 3,973,935 | 8/1976 | Moore et al. | 55/302 |
| 4,751,501 | 6/1988 | Gut | 55/274 |
| 4,865,634 | 9/1989 | Griffis | 55/213 |
| 4,968,333 | 11/1990 | Ellis et al. | 55/356 |
| 5,042,997 | 8/1991 | Rhodes | 55/213 X |
| 5,069,691 | 12/1991 | Travis et al. | 55/356 |
| 5,147,427 | 9/1992 | Abbot et al. | 55/302 |
| 5,192,343 | 3/1993 | Henry | 55/213 |

FOREIGN PATENT DOCUMENTS

| | | | |
|---|---|---|---|
| 1040113 | 10/1978 | Canada | 55/302 |
| 205075 | 12/1983 | German Democratic Rep. | 55/444 |

OTHER PUBLICATIONS

American Air Filter, "Astrocel", AF-1-110-F, Aug. 1985.
Installation and Operation Manual Torit Filter System Dust Collectors ECB2 ECB3 ECB4 Donaldson Co. 1985.

*Primary Examiner*—Charles Hart
*Attorney, Agent, or Firm*—Ogram & Teplitz

[57] ABSTRACT

An air filtration system with a safety after-filter that prevents contaminated air being exhausted by using a backup filter and with a mechanism to detect tears or leaks in the primary filters. The safety after-filter assembly attaches to the exhaust of an air filtration system and collects dirt particles which get by the primary filters. Detection of rips, tears, or leaks in the primary filters is accomplished by monitoring the air pressure difference across the safety after-filter and is measured by a differential pressure gauge. If a primary filter develops a tear or leak, the safety after-filter quickly becomes clogged with dirt and the pressure difference across the safety after-filter increases. If the safety after-filter itself develops a tear or leak, the pressure difference across the safety after-filter decreases. Either condition causes alarms to be triggered and the system is powered down, thus preventing contaminated air being exhausted.

7 Claims, 3 Drawing Sheets

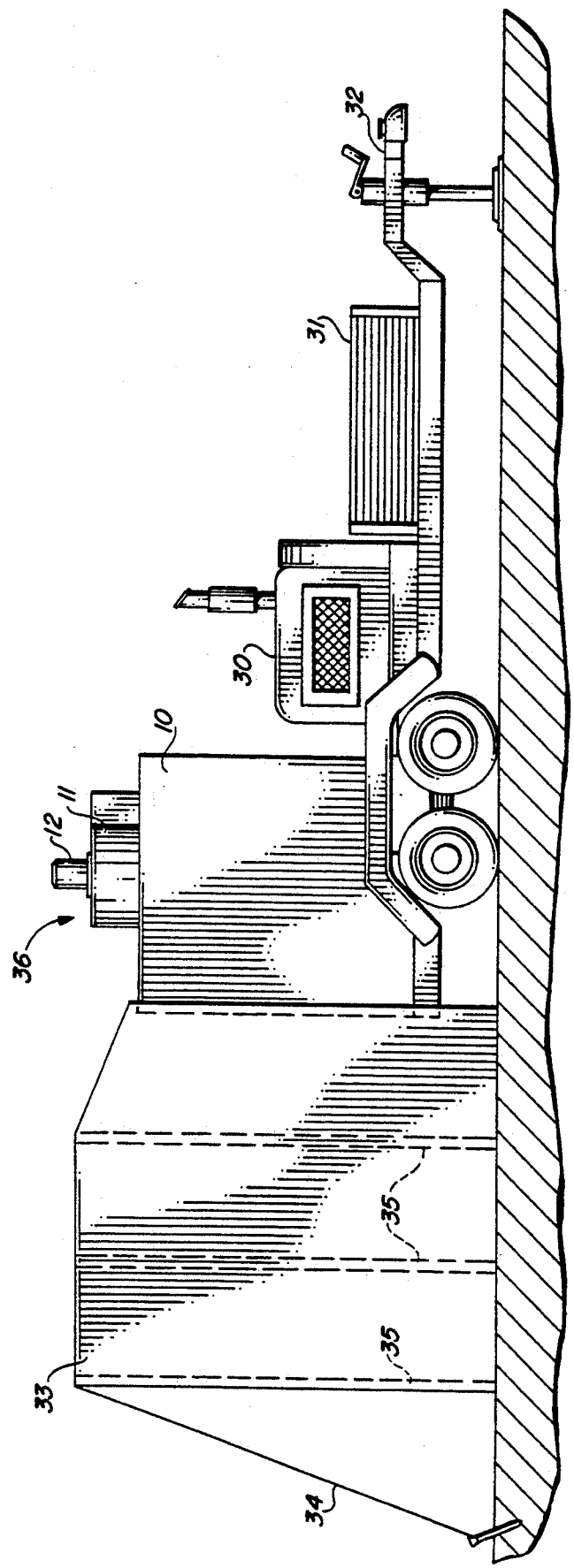

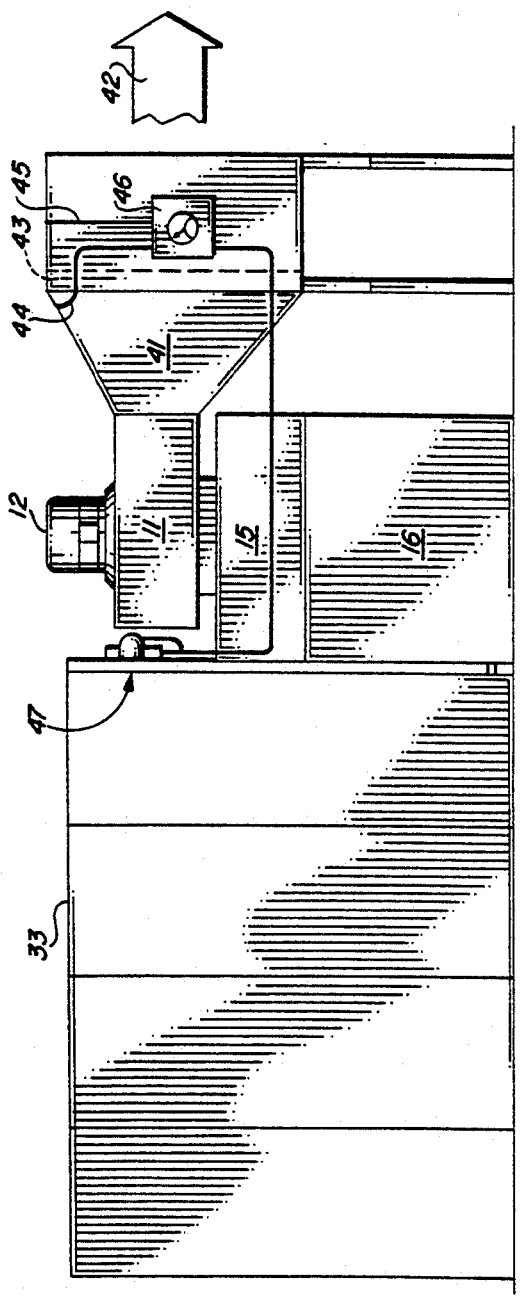
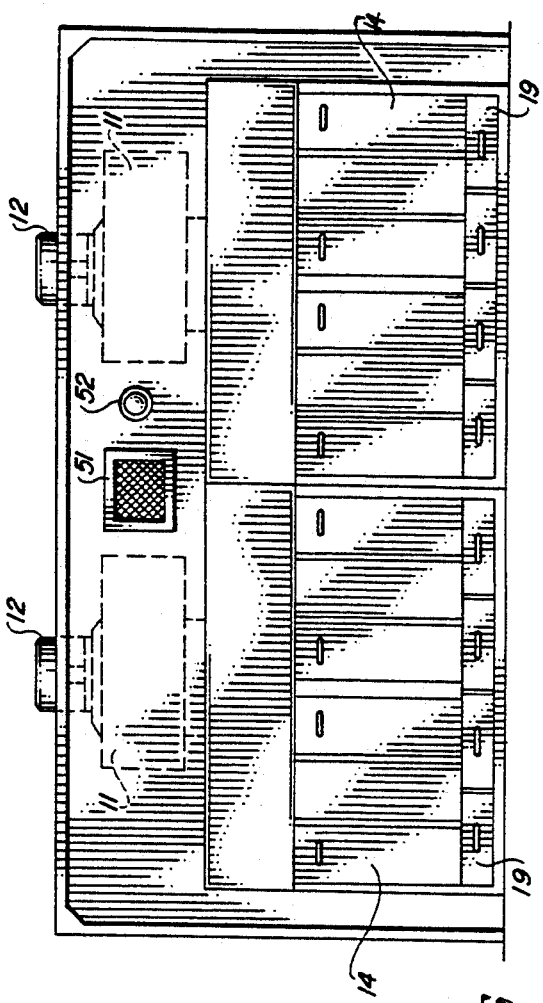

AIR FILTRATION SYSTEM WITH SAFETY AFTER-FILTER

BACKGROUND OF THE INVENTION

This application is a continuation-in-part of application Ser. No. 07/731,755, filed Jul. 15, 1991, now U.S. Pat. No. 5,147,427.

This invention relates generally to hazardous dust generating processes and more particularly to air filtration systems used in conjunction with hazardous dust generating processes rooms.

Maintaining a clean environment is critical in many industries. Air borne debris has detrimental affects both upon products and workers in the area. This makes the collection of dust and other airborne particles generated from abrasion blasting, removing of dry products, or similar dust generating activities, essential for the well being of workers and the environment. In many industrial areas, the Federal Environmental Protection Agency has set strict standards for the air quality in order to protect workers and the environment.

Within the abrasive blasting industry, the need for clean air is critical since dirty air: (i) obstructs visibility which may lead to damage to the substrate being cleaned and (ii) may require more expensive and cumbersome breathing equipment to protect the operator.

Suspended debris in the abrasive blasting industry consists not only of dust from spent abrasive medium, but also from the removed paints and coatings, many of which are hazardous to an operator's health.

Another important consideration is the portability of equipment. With the increasing need for air filtration at abrasive blast sites such as bridges, exteriors of buildings, dry docked boats, and the like, the need to have a truly portable system is paramount.

In many situations, the paint or coating to be removed must be handled with care since many contain heavy metals such as lead or chrome which results in the residue from these coatings being classified as hazardous or toxic waste. Air borne contaminants are no exception. These air borne contaminants must be filtered out before the air is exhausted into the environment.

Some environmental quality regulations will soon require filtration systems to verify that hazardous waste is not being exhausted. Currently, no filtration systems insure that hazardous debris is not being exhausted to the environment.

To provide for a clean working environment, the typical solution is to provide a cyclone wind turbine to draw air, via duct work, from the to-be-cleaned room. This provides a negative pressure room to encourage the debris to stay within the system and not leave the room.

An example of such a system is described by U.S. Pat. No. 4,789,387, entitled "Dust Collector" issued to Nemesi et al. on Dec. 6, 1988.

Typical movement of air within an abrasive blast room is in the 50-70 linear Feet per Minute (FPM) range. To achieve this movement and cleaning of the air, motors on the order of one horse or more are required. Motors having this capability use an exorbitant amount of electrical energy and thereby reduce the efficiency of the abrasive blasting system.

Furthermore, these systems are designed for a specific room under standardized conditions. Little flexibility is provided since to increase the capacity of the system requires major redesign and reconstruction of the cyclone, ducts, and bag houses.

To provide for a more efficient use of the electrical energy, and also give a little flexibility, some air cleaning systems utilize wall units. These modular units fit into a wall of the room. Such apparatus are commercially sold by Torit, a division of Donaldson Company, Inc. and are associated with Environmental Control Booths.

The Torit apparatus eliminates the duct work normally associated with dust control and provides for louvers between the to-be-cleaned room and the dust collection apparatus. The dust collection apparatus uses standard air filtration cartridges. Air is drawn directly through the louvers, through the filter cartridges, and then exhausted into the atmosphere.

Although the Torit apparatus does come in three different sizes, modification to accommodate different air flow requirements is cumbersome and often impossible since large air flow requirements would require long banks of units and motors with complex motor start control systems. Further, the Torit apparatus is designed to provide only minimal cleaning capability since only a small portal for air flow is provided. Even more restrictive, the Torit apparatus is not easily made portable.

Without portability, the Torit apparatus is totally unsuitable for many critical applications which arise in the modern world.

It is clear from the foregoing that an efficient, portable, versatile, and toxic contaminant air cleaning system does not exist.

SUMMARY OF THE INVENTION

This invention creates an air filtration system with a safety after-filter that prevents contaminated air being exhausted by using a backup safety-filter and detecting tears or leaks in the primary filters. The safety after-filter assembly attaches to the exhaust of an air filtration system. The safety after-filter collects dirt particles which get by the primary filters and also allows detection of rips, tears, or leaks in the primary filters. The air pressure difference across the safety after-filter is measured by a differential pressure gauge. If a primary filter develops a tear or leak, the safety after-filter quickly becomes clogged with dirt and the pressure difference across the safety after-filter increases. If the safety after-filter itself develops a tear or leak, the pressure difference across the safety after-filter decreases. Either condition causes alarms to be triggered and the system is powered down, thus preventing contaminated air being exhausted.

The present discussion provides for an air filtration system that reduces positive and/or negative air flow resistance by eliminating duct work from the room to the filtering system. The filtering system forms a common wall with the to-be-filtered room permitting the dirty air to move easily and quickly through to the cleaning process. Through the use of vertical baffles and reverse jets, debris is easily and efficiently collected in drawers or trays located at the bottom of the filtration system. Because of the modular design of the invention, the filtration system is easily placed on a trailer and transported to remote sites. Further the portable filtration system uses a portable flexible shroud to assist in cleaning items at the site (i.e. bridges, building exteriors, etc.).

An important feature of the system is the safety after-filter with alarms and automatic shutdown. This feature detects problems with the filters and prevents exhausting of contaminated air.

Although the present discussion relates to the removal of dust, paint particles, and other related matter, those of ordinary skill in the art readily recognize that the present invention is applicable for cleaning any suspended dry matter from a room's air.

The air filter system of the present invention forms one of the walls to the to-be-cleaned room. To the maximum extent possible, the air filter communicates with the to-be-cleaned room. In the preferred embodiment, this level of communication is over fifty percent of the wall space.

Located between the air filter system and the to-be-cleaned room is a baffle system arranged in a vertical fashion. The vertical baffles provide for a visual and physical barrier between the room and the air filter system; but, the baffles readily permit debris laden air to pass into the air filter system.

The vertical baffles ar important since their structure discourages the formation of a film of debris on their surfaces. As the debris passes through, some of the debris does tend to stick to the surfaces, yet the force of gravity tends to dislodge this debris, maintaining the baffles in a relatively clean state.

Air flowing through the baffles enter a "dirty air plenum" within the air filter system which is used to collect the debris. This section of the air filtration system has extending into it, several air filtration cartridges through which the air flows and which clean the air of suspended debris.

This debris is periodically removed from the filters through the use of reverse pulse jets known to those of ordinary skill in the art. One such reverse pulse jet is described in U.S. Pat. No. 4,578,092, entitled "Method and Apparatus for Improving the Operation of a Dust Collector" issued to Klimczak on Mar. 25, 1986, and incorporated hereto by reference.

At the bottom of the "dirty air plenum" with its attendant air filter cartridges, and also below the baffles, is located a debris removal apparatus. In the preferred embodiment this debris removal apparatus is a series of drawers which are removable from outside the air filter apparatus. These drawers collect the debris which falls from the baffles, and also the debris ejected from the filter cartridges due to the reverse pulsed jets.

In an alternative environment, a collection of hoppers replaces the drawers and are used to collect the fallen debris for immediate, constant, or periodic removal either manually or automatically. Those of ordinary skill in the art recognize various structures which work in this context.

An important feature of the invention is the safety after-filter with alarms and automatic shutdown. The safety after-filter filters the air after it has passed through the primary air filtration cartridges. This provides a safety backup in case of a tear or leak in the primary air filtration cartridges. The system also detects a problem with either the primary air filtration cartridges or the safety after-filters, activates alarms, and automatically shuts down the system, i.e. cuts off electric power, to prevent contaminated air being exhausted.

The automatic shutdown feature is particularly useful where preventing toxic material being exhausted is important.

In one embodiment, electric power is cut off to both the filtration system and to the tools in the to-be-filtered room. This prevents any contaminants from being exhausted and stops the generation of more contaminants.

In another embodiment, electric power is cut off to only the electric tools in the to-be-filtered room while the filtration system continues to operate for a short time. This embodiment allows the to be-filtered room to be ventilated while stopping the production of more contaminants.

Problems with the filters are detected using an air pressure differential gauge. Air pressure lines are located on both sides of the safety after-filter. The pressure differential between the two pressure lines must remain in the allowable range for proper operation. An increased pressure difference indicates the safety after-filter has become clogged or filled with dirt. A reduced pressure difference indicates a tear or leak in the safety after-filter. Either condition causes alarms to trigger and automatic shutdown to occur.

One of the most important aspects of the preferred embodiment of the invention is that the structure of the air filter system permits the system to be quickly and easily adjusted to obtain the desired air flow for the cleaning required by the specific situation. The driving motor is positioned at the top of the blower permitting the motor to be replaced easily. This facilitates the altering of the air flow characteristics of the air filtration system.

As example, a particular system is customizable to anything from 3,000 CFM to 20,000 CFM by adjusting the motor size. This replacement of the motor permits optimal matching of the air filtration system to the to-be-cleaned room.

Another aspect of the preferred embodiment is the modular approach in which the air filter system is portable and is easily attached, through zippers, clasps, or the like, to a flexible room or shroud. This flexible room or shroud, constructed of such material as canvas or plastic sheeting, is adaptable for use in exterior environments for cleaning planes, buildings, bridges, boats, and other such equipment and edifices.

By placing the filter system on a trailer, the filter system is easily transported to the site and used there until the job is completed. The flexible room is disassembled, loaded onto the trailer, and the entire system is transported to a new site for a different job.

The invention, together with various embodiments thereof will be more fully described by the following drawings and their accompanying descriptions.

DRAWINGS IN BRIEF

FIG. 3 is a side view of a transportable embodiment of the invention.

FIG. 4 is a side view of the preferred embodiment showing the safety after-filter, alarms, and automatic shutdown features.

FIG. 5 is a front view of the preferred embodiment showing the visual and audible warning alarms.

DRAWINGS IN DETAIL

Figure 1:
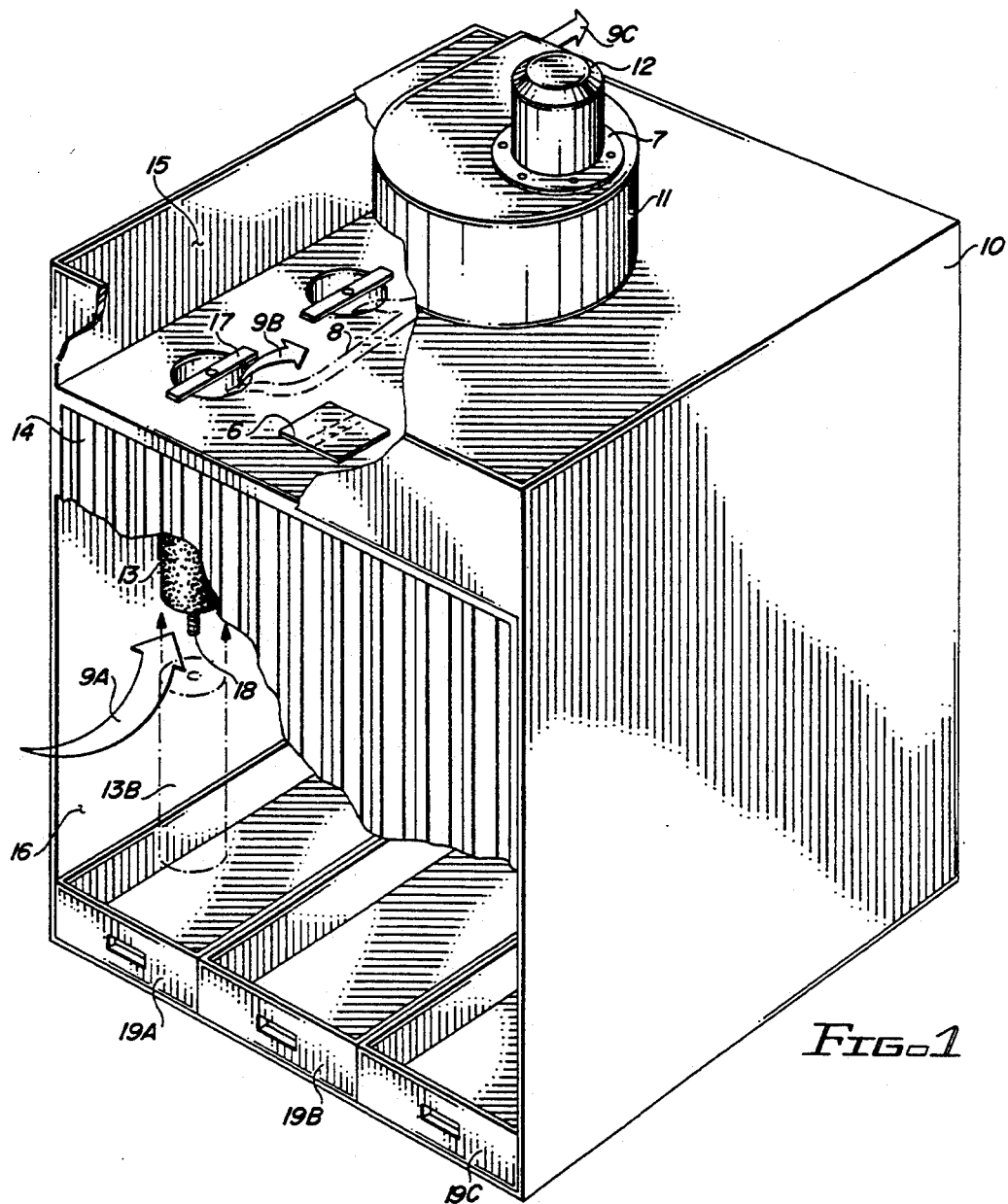
FIG. 1 is a perspective view of the preferred embodiment of the invention.

FIG. 1 is a perspective view of the preferred embodiment of the invention. Housing member 10 is composed of two basic sections: a dirty air plenum 16 and a clean air plenum 15. Dirty air plenum 16 communicates with the abrasive blast room (not shown) via baffles 14 which extend substantially to the floor. Baffles 14 form a section of one wall of the abrasive blast room and permit debris laden air to enter dirty air plenum 16.

Several air filter cartridges 13 extend from the clean air plenum 15 into the dirty air plenum 16. Air passing through the air filter cartridges 13 is cleaned of any suspended debris. This debris is periodically purged from the surface of the air filter cartridges via a reverse pulse jet, 8.

Although the present invention utilizes a reverse pulse jet, those of ordinary skill in the art readily recognize various alternative methods to removed trapped debris from the surface of air filter cartridges including but not limited to shakers and the like.

Air filtration cartridges 13 are secured in place by a bolt and nut arrangement 18 that extends through the center of air filtration cartridge 13. This arrangement permits easy removal of the air filtration cartridge as illustrated by 13B.

In one embodiment of the invention, the top hole in which air communicates through the air filter cartridge 18 with the clean air plenum 15 is closed via a solid plug 6. This technique of plugging selected air filter cartridges is used when the full capability of the air filter system is not required or desired.

Blower 11 is powered by motor 12 which exhausts air from clean air plenum 15 as indicated by arrow 9C. Debris laden air enters the system through baffles 14 as shown by arrow 9A; passes through the air filter cartridge 13 and enters the clean air plenum 15 as indicated by arrow 9B.

In this manner, dirty air is drawn into the air filtration system and clean air is exhausted into the environment. Motor 12 is removable via bolts and collar 7.

The debris collected by the air filter system collects on the air filter cartridges 13 and also tends to collect on the baffles 14. The baffles 14, being vertical in nature, utilize natural gravity to dislodge and release the deposited debris. The debris from the air filter cartridges falls to the bottom of the dirty air plenum and collects in drawers 19A, 19B, and 19C.

These drawers are periodically removed and cleaned of the collected debris. The debris so collected includes spent media, dust from the abrasive blasting operation, and removed material.

In one embodiment of the invention, bin type hoppers are used in lieu of drawers 19A, 19B, and 19C. Use of hoppers permit the automatic removal of fallen debris.

The dimensions of housing 10 need not be adjusted to fit the to-be-cleaned room's size. A wall of the to-be-cleaned room is common with a wall of the air filtration system. By simple adjustments to the motor 12 and blower 11, the proper air movement is easily obtained.

Figure 2:
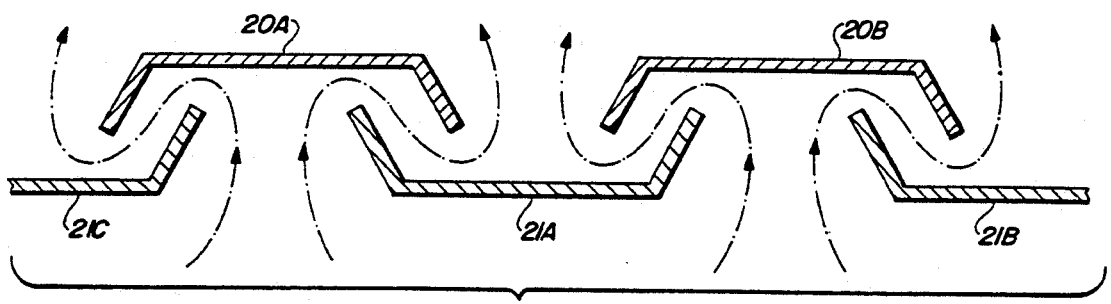
FIG. 2 is a top view of the preferred embodiment of the baffles used in the embodiment of FIG. 1.

FIG. 2 is a top view of the preferred embodiment of the baffles first illustrated in FIG. 1.

The baffle system is composed of a series of generally widened "U" shaped channels which are interlocked as indicated by U's 20A, 20B with U's 21A, 21B and 21C. This interlocking permits air flow, as indicated by arrows 22, to pass between the U's but provides a physical and visual barrier between the to-be-cleaned room and the air filtration system.

The vertical nature of the baffles is important since it is this arrangement which permits the easy and automatic cleaning of collected debris, without causing resistance to the air flow into the dirty air plenum.

In one embodiment of the invention, the baffles are equipped with a shaker which further facilitates the removal of collected debris.

Although the present invention utilizes generally "U" shaped channels, those of ordinary skill in the art readily recognize various other shapes which lend themselves to the objective of the present invention including baffles having interlocking sinus curve shapes or even overlapping planar panels.

FIG. 3 is a side view of a transportable version of the present invention.

An air filtration system 36 as discussed relative to FIG. 1 including housing 10, blower 11 and motor 12, is mounted onto trailer 32 for transportation to the abrasive blasting site. Also mounted on trailer 32 is generator 30 which provides power to the air filtration system, and rack 31 which holds the flexible and collapsible building 33 when disassembled.

Collapsible building 33 attaches to the air filtration system 10 through snaps, zippers, or other techniques known to those of ordinary skill in the art. An internal skeleton 35 provides support while tension line 34 maintains the flexible room 33 in an upright position.

This embodiment of the invention provides for easy transportation to the blast site (such as where aircraft are to be cleaned) and easy use. Note that the air filtration system 36 and generator 30 are permanently mounted on trailer 32.

The reduction of positive and negative resistance achieved by eliminating duct work, allows higher volumes of air to be filtered using much lower horsepower motors than units of conventional design.

FIG. 4 is a side view of the preferred embodiment showing the safety after-filter, alarms, and automatic shutdown features.

Motor 12, blower 11, clean air plenum 15, dirty air plenum 16, and to-be-filtered room 33 have been described relative to previously discussed embodiments.

The exhaust housing 41 is attached to blower 11. All air exhausted by blower 11 passes through exhaust housing 41 and is exhausted as shown by arrow 42.

Inside exhaust housing 41 is the safety after-filter 43. All exhausted air passes through safety after-filter 43. Safety after-filter 43 is any filter of sufficient quality for the job at hand. The preferred embodiment uses a High Efficiency Particulate Air (HEPA) filter. HEPA filters are commonly known in the art and are commercially available from the Farr Company. In the preferred embodiment, the HEPA filter obtains an efficiency of 99.97% (or better) on particle size of 0.3 micron.

The high pressure line 44 and the low pressure line 45 communicate air pressures to differential pressure gauge 46. High pressure line 44 communicates the air pressure before the air pass through safety after-filter 43. Low pressure line 45 communicates the air pressure on the exhaust side of the safety after-filter 43.

Differential pressure gauge 46 measures the pressure difference between the two pressure lines 44 and 45. When differential pressure gauge 46 measures a pressure difference that is either too large or too small, the relay/switch (not shown), controlled by differential pressure gauge 46, cuts off power to motor 12 and energizes audible and visual warnings 47.

In the preferred embodiment, power to motor 12 and to tools in the to-be-filtered room 33 is enabled (or disabled) by power enable circuit 48. Power enable circuit 48 enables motor power switch 48a and to-be-filtered room power switch 49b. Motor power switch 48a shuts of power to motor 12 when differential pressure gage 46 detects a problem with safety after-filter 43. Likewise, to-be-filtered room power switch 49b shuts off power to tools which are generating the contaminates in the to-be-filtered room 33. This is only the preferred embodiment of a power enable circuit. Those of ordinary skill in the art readily see alternate embodiments which perform substantially the same function or work, in substantially the same way, to obtain substantially the same overall result.

Set points (high and low) on differential pressure gauge 46 are adjustable so the high pressure and low pressure trigger points can be adjusted for varying conditions.

Those of ordinary skill in the art readily see several alternative methods of measuring the air pressure difference across the safety after-filter 43. These include, but are not limited to, placing individual pressure gauges on each side of safety after-filter 43 which communicate pressure values to a control unit.

The preferred embodiment uses a Photohelic® differential pressure gauge with relay/switch to measure the pressure difference across safety after-filter 43, to cut off power to motor 12, and to energize warnings 47. Photohelic® differential pressure switch/gages are commercially available from Dwyer Corporation.

In operation of the preferred embodiment, a rip or tear in a primary air filtration cartridge allows dirt particles to quickly clog the safety after-filter 43. The clogged safety after-filter 43 causes an increase pressure difference across the safety after-filter 43. The increased pressure difference is detected by differential pressure gauge 46 which cuts off power to motor 12 and energizes warnings 47.

A rip or tear in safety after-filter 43 causes a decreased pressure difference across the safety after-filter 43. The decreased pressure is detected by differential pressure gauge 46 which cuts off power to motor 12 and energizes warnings 47.

In one embodiment, both the filtration system and the blasting room are shutdown immediately when a problem in the filters is detected.

In another embodiment, only the blasting room is shutdown immediately. The filtration system continues to operate for a short time to ventilate the blasting room.

FIG. 5 is a front view of the preferred embodiment showing the visual and audible warning alarms.

This view shows the filtration system as it is viewed from the to-be-filtered room. Motors 12, blowers 11, baffles 14, and drawers 19 have been described in previous embodiments. Motor power switch 48a and to-be-filtered room power switch 48b have been described in previous figures.

Audible warning 51 and visual warning 52 alert the operator of a problem with the filters. Personnel in the to-be-filtered room can see the visual warning 52 and hear the audible warning 51. Personnel outside the to-be-filtered room can hear the audible warning 51. The combination of both audible and visual warnings 51 and 52 assure that the operator will be alerted to the problem.

It is clear from the foregoing that the present invention provides for a vastly improved air filtration system and safety after-filter that is easily modified for specific requirements and is easily transported to address on-site abrasive blasting.

What is claimed is:

1. An air filtration system for cleaning air within a room comprising:
   a) a housing, one side of said housing forming a common wall with said room, said housing having a lower first section and an upper second section;
   b) baffles disposed between the first section of said housing and said room, said baffles substantially covering said common wall;
   c) a chamber formed in the second section having at least three air filtration cartridges extending into said first section;
   d) blower means attached to an exterior portion of said housing, said blower means communicating with said second section for drawing air from said second section and exhausting the air exterior to said housing;
   e) a motor located external to said housing for driving said blower means; and,
   f) at least two drawers located substantially at the bottom of said housing, said drawers being operable from an exterior position to said housing, said drawers being positioned to receive falling debris from said baffles and from said first section of said housing;
   g) an exhaust housing attached to said blower means for exhausting air from said blower means; and,
   h) a safety after-filter attached inside said exhaust housing such that all said exhausting air passes through said safety after-filter.

2. The air filtration system according to claim 1 wherein said exhaust housing further comprises:
   a) pressure sensor means for measuring air pressure on both sides of said safety after-filter; and,
   b) alarm means connected to said pressure sensor means for signaling when the pressure difference across said safety after-filter is not within specified limits.

3. The air filtration system according to claim 2 wherein said alarm means further includes motor disconnect means for disconnecting electric power to said motor.

4. The air filtration system according to claim 3 wherein alarm means further includes means for disconnecting power to tools in said room.

5. An air filtration system for cleaning air within a flexible room comprising:
   a) a housing, one side of said housing attachable to and forming a common wall with said flexible room, said housing having a lower first section and an upper second section;
   b) baffles disposed between the first section of said housing and said room, said baffles substantially covering said common wall;
   c) a chamber formed in the second section having at least three air filtration cartridges extending into said first section;
   d) blower means attached to an exterior portion of said housing, said blower means communicating with said second section for drawing air from said second section and exhausting the air exterior to said housing;
   e) a motor for driving said blower means;
   f) at least two drawers located substantially at the bottom of said housing, said drawers being operable from an exterior position to said housing, said drawers being positioned to receive falling debris from said g) an exhaust housing attached to said blower means, said blower means communicating with said exhaust housing for exhausting air from said blower means; and, h) a safety after-filter attached to the interior of said exhaust housing so that said air passes through said safety after-filter.

6. The filtration system according to claim 5 further comprising:

a) differential pressure sensor means for measuring the air pressure difference across said safety after-filter; and, b) alarm means for providing visual and audible signals to operators when said air pressure difference measured by said differential pressure sensor means is not in a specified range.

7. The filtration system according to claim 6 wherein said alarm means further comprises shutdown means for turning off power to said motor and to tools in said flexible room when said air pressure difference measured by said differential pressure sensor means is not in a specified range.

* * * * *